(12) United States Patent
Uemura (10) Patent No.: US 8,919,406 B2
(45) Date of Patent: Dec. 30, 2014

(54) BONDING APPARATUS

(71) Applicant: Fuk Co., Ltd., Nara (JP)

(72) Inventor: Mitsuo Uemura, Nara (JP)

(73) Assignee: Fuk Co., Ltd., Nara (JP)

( * ) Notice: Subject to any disclaimer, the term of this patent is extended or adjusted under 35 U.S.C. 154(b) by 0 days.

(21) Appl. No.: 14/182,411

(22) Filed: Feb. 18, 2014

(65) Prior Publication Data

US 2014/0299276 A1   Oct. 9, 2014

(30) Foreign Application Priority Data

Apr. 4, 2013   (JP) .................................. 2013-078529

(51) Int. Cl.
| | | |
|---|---|---|
| *B32B 37/00* | (2006.01) | |
| *G02F 1/13* | (2006.01) | |
| *G06F 3/041* | (2006.01) | |
| *B32B 37/10* | (2006.01) | |
| *B29C 65/00* | (2006.01) | |

(52) U.S. Cl.
CPC .............. *G02F 1/1303* (2013.01); *G06F 3/041* (2013.01); *B32B 37/10* (2013.01); *B29C 66/92* (2013.01)
USPC ............................ 156/358; 156/555; 156/582

(58) Field of Classification Search
USPC ........................ 156/358, 555, 580, 582, 583.1
See application file for complete search history.

(56) References Cited

U.S. PATENT DOCUMENTS

| | | | | |
|---|---|---|---|---|
| 5,162,071 A | * | 11/1992 | Nagafuchi et al. ............ | 156/517 |
| 5,211,800 A | * | 5/1993 | Taguchi et al. ............... | 156/521 |
| 5,240,545 A | * | 8/1993 | Washizaki et al. ............ | 156/360 |
| 5,685,943 A | * | 11/1997 | Taguchi et al. ............... | 156/521 |
| 7,267,150 B2 | * | 9/2007 | Shimizu et al. ............... | 156/378 |
| 8,029,430 B2 | * | 10/2011 | Neubauer et al. ............ | 493/421 |

FOREIGN PATENT DOCUMENTS

JP       2009-040617       2/2009

* cited by examiner

*Primary Examiner* — James Sells
(74) *Attorney, Agent, or Firm* — Kirschstein et al.

(57) ABSTRACT

The bonding apparatus 1 includes a leading end support part 10 that restricts a leading end 201 of the second plate-like member 200 from moving in an up and down direction, a trailing end support part 20 that restricts a trailing end 202 of the second plate-like member 200 from moving in an up and down direction, and an intermediate support part 40 that moves in the same direction as a bonding roller 30 while supporting the second plate-like member 200 at an intermediate point between the trailing end 202 and a bonding position P that is pressed by the bonding roller 30. When the bonding roller 30 is moving, the trailing end support part 20 keeps supporting the trailing end 202 at a lower position than the leading end 201, and the intermediate support part 40 keeps supporting the intermediate point of the second plate-like member 200 at a position lower than the leading end 201 but higher than the trailing end 202.

10 Claims, 9 Drawing Sheets

Fig. 1

Bonding Direction

Bonding Direction →

Bonding Direction

Prior Art

_US 8,919,406 B2_

BONDING APPARATUS

TECHNICAL FIELD

The present invention relates to a bonding apparatus for bonding a plate-like member to another plate-like member in the atmosphere.

BACKGROUND ART

Generally, when bonding together a first plate-like member such as a liquid crystal panel or a touch panel and a second plate-like member such as a glass cover to protect the surface of the first plate-like member, it is crucial to prevent entrapment of air bubbles between the first and second plate-like members. Entrapped air bubbles lead to lower display quality and cause separation of plate-like members.

Known bonding apparatuses that are able to prevent entrapment of air bubbles perform bonding in vacuum. In a bonding apparatus of this type, before the bonding, a first and second plate-like members are introduced into a vacuum chamber and then an evacuation is performed. After the bonding is finished, the vacuum is broken and the first and second plate-like members are taken out. However, such a bonding apparatus would need a large-scale vacuum chamber and the like, and had low productivity because of the necessity to perform an evacuation every time bonding was performed.

Figure 9:
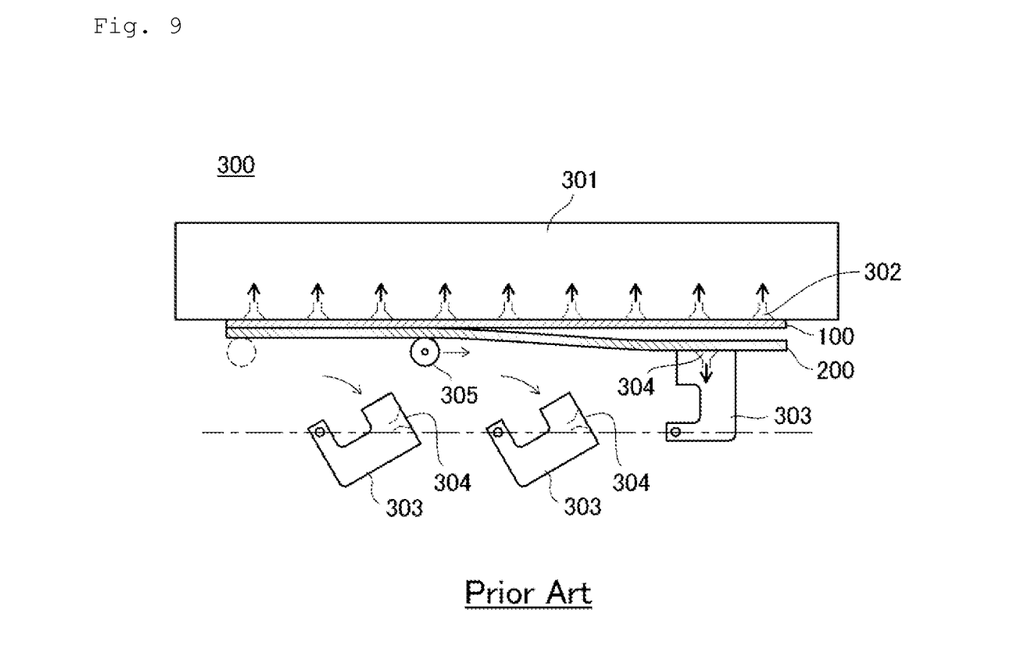
FIG. 9 is a side view of a conventional bonding apparatus.

Patent Document 1, for example, describes a conventional bonding apparatus that resolves the problem described above. In this bonding apparatus 300, as shown in FIG. 9, a first plate-like member 100 is held by suction with a plurality of suction nozzles 302 on the lower surface of a table 301, while a second plate-like member 200 is held by suction with suction nozzles 304 of a plurality of suction members 303 arranged along a horizontal direction. The first plate-like member 100 and the second plate-like member 200 are set opposite each other at a predetermined distance before the bonding.

Bonding is achieved in this bonding apparatus 300 by pressing the second plate-like member 200 against the first plate-like member 100 with a bonding roller 305 and moving the bonding roller 305 in the direction of the arrow in the drawing. As shown in FIG. 9, the suction members 303 that are in the way of the moving bonding roller 305 retract one by one as the bonding roller 305 moves. The suction members 303 keep holding a part of the second plate-like member 200 that is not bonded yet and spaced apart from the first plate-like member 100. Therefore, the second plate-like member 200 is deflected as it is bonded to the first plate-like member 100.

The bonding apparatus 300 is capable of preventing air entrapment between the plate-likemembers, since the bonding roller 305 pushes out air bubbles as the first plate-like member 100 and the second plate-like member 200 are bonded together. Moreover, the apparatus 300 does not require a large-scale vacuum chamber or the like.

PRIOR ART DOCUMENTS

Patent Documents

Patent Document 1: JP2009-40617A

SUMMARY OF THE INVENTION

Problems to be Solved by the Invention

However, with the bonding apparatus 300 described in Patent Document 1, there is a possibility that, when the resilient force the second plate-like member 200 has in itself to counteract the deflection during the bonding exceeds the suction force of the suction nozzles 304, the second plate-like member 200 is pulled apart from the suction members 303 and so-called "premature attachment" can occur, in which the second plate-like member 200 is bonded to the first plate-like member 100 before it is pressed by the bonding roller 305. Such premature attachment causes a large amount of air bubbles to be entrapped between the first plate-like member 100 and the second plate-like member 200.

The present invention was made in view of the circumstances described above, its object being to provide a bonding apparatus capable of bonding a second plate-like member to a first plate-like member in the atmosphere while reliably preventing air entrapment due to premature attachment.

Means for Solving the Problems

To solve the above problems, the bonding apparatus according to the present invention is a bonding apparatus in which a first plate-like member supported on a lower surface of a bonding stage and a second plate-like member located lower than the first plate-like member are positioned, after which the second plate-like member is pressed from below with a bonding roller, and the bonding roller is moved relative to the first plate-like member and the second plate-like member in a bonding direction, so as to bond the second plate-like member to the first plate-like member. The bonding apparatus includes: a leading end support part that is movable up and down and restricts a leading end of the second plate-like member on an upstream side in the bonding direction from moving in an up and down direction; a trailing end support part that is movable up and down and restricts a trailing end of the second plate-like member on a downstream side in the bonding direction from moving in an up and down direction; and an intermediate support part that is movable up, and down and moves in the same direction as the bonding roller while supporting the second plate-like member at an intermediate point between the trailing end and a bonding position that is pressed by the bonding roller, wherein when the bonding roller is moving, the trailing end support part keeps supporting the trailing end at a lower position than the leading end, and the intermediate support part keeps supporting the intermediate point of second plate-like member at a position lower than the leading end but higher than the trailing end.

With this structure, the leading end of the second plate-like member is restricted by the leading end support part from moving in the up and down direction, and the trailing end of the second plate-like member is restricted by the trailing end support part from moving in the up and down direction, so that entrapment of air bubbles due to premature attachment is reliably prevented. With this structure, also, the intermediate support part supports the second plate-like member at the intermediate point between the trailing end and a bonding position that is pressed by the bonding roller, so that the second plate-like member is prevented from sagging by its own weight during bonding. Furthermore, with this structure, bonding is performed while the bonding roller pushes out air bubbles as it moves in the bonding direction, so that air entrapment between the first plate-like member and the second plate-like member is prevented even though they are bonded together in the atmosphere.

In the bonding apparatus described above, preferably, the trailing end support part and the intermediate support part are controlled to move up and down in synchronism with the movement of the bonding roller and the intermediate support part so as to maintain the second plate-like member in a predetermined bended state.

With this structure, the second plate-like member is maintained in the predetermined bended state by the control of up and down movement of the trailing end support part and the intermediate support part, so that the second plate-like member is prevented from being deflected too much and damaged, and that premature attachment, which may be caused if the angle of the second plate-like member relative to the first plate-like member is too small at the bonding position (hereinafter, "bonding angle"), is reliably prevented. The predetermined bended state is determined based on a thickness and a dimension in the bonding direction of the second plate-like member, for example.

In the bonding apparatus described above, preferably, pressure applied by the bonding roller is kept constant during the movement of the bonding roller.

With this structure, the bonding roller is prevented from applying too much pressure to damage the second plate-like member and the first plate-like member, or from failing to apply enough pressure to fully push out air bubbles.

In the bonding apparatus described above, the intermediate support part may comprise one intermediate support roller. In this case, when the intermediate support roller reaches near the trailing end, the intermediate support roller may be retracted so as not to impede the movement of the bonding roller thereafter.

In the bonding apparatus described above, alternatively, the intermediate support part may comprise a plurality of intermediate support rollers arranged at a predetermined distance in the bonding direction. In this case, when one of the plurality of intermediate support rollers reaches near the trailing end, this intermediate support roller may be retracted so as not to impede the movement of the bonding roller and other intermediate support rollers thereafter.

In the bonding apparatus described above, preferably, the trailing end support part supports the trailing end at a lower position than the leading end, and the intermediate support part supports an intermediate point of the second plate-like member at a position lower than the leading end but higher than the trailing end so as to bring the second plate-like member to a predetermined curved state, after which the leading end support part, the trailing end support part, the bonding roller, and the intermediate support part move up by the same amount, so as to bond the leading end of the second plate-like member to the first plate-like member.

With this structure, air entrapment between the first plate-like member and the second plate-like member at the start of bonding can be prevented.

The first plate-like member is typically a liquid crystal panel or a touch panel, and the second plate-like member is typically a glass cover, but the first plate-like member and the second plate-like member are not limited to these.

Effect of the Invention

The present invention can provide a bonding apparatus capable of bonding a second plate-like member to a first plate-like member in the atmosphere while reliably preventing air entrapment due to premature attachment.

MODE FOR CARRYING OUT THE INVENTION

Hereinafter, the bonding apparatus according to an embodiment of the present invention will be described with reference to the accompanying drawings.

[Structure of the Bonding Apparatus]

Figure 1:
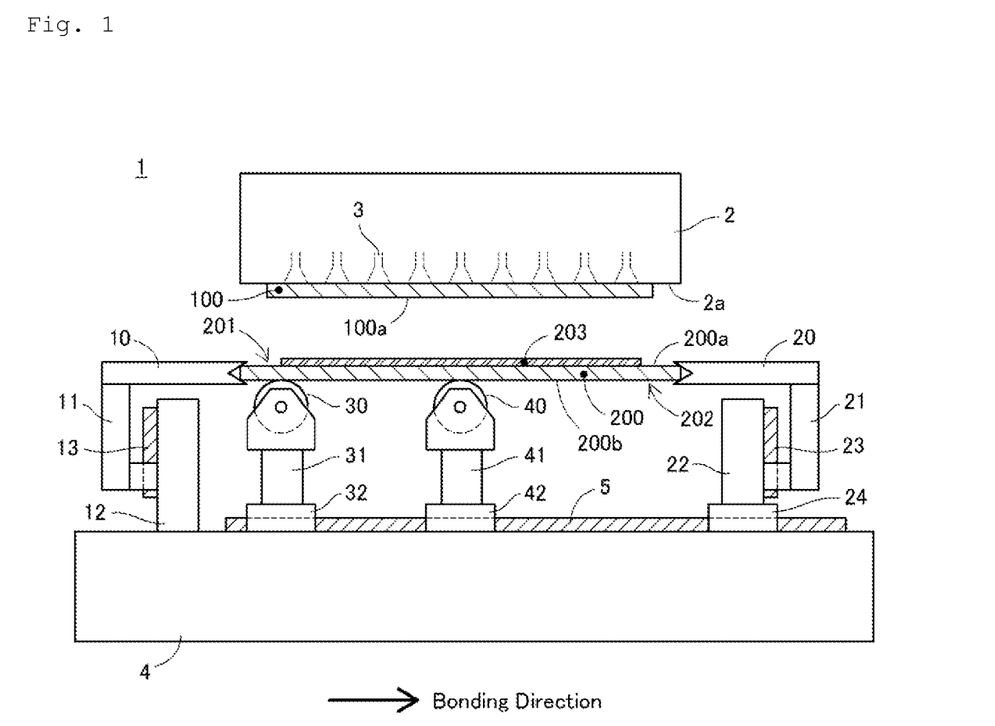
FIG. 1 is a side view of a bonding apparatus according to the present invention.

FIG. 1 shows a bonding apparatus according to an embodiment of the present invention. The bonding apparatus 1 according to this embodiment is designed for bonding a second plate-like member 200 to a first plate-like member 100 in the atmosphere. In this embodiment, the first plate-like member 100 is a touch panel, and the second plate-like member 200 is a 1.0 mm thick glass cover made of soda glass. The first plate-like member 100 may be a liquid crystal panel. The second plate-like member 200 may be a soda glass panel of about 0.5 to 2.0 mm thickness, or a plastic (e.g., polycarbonate or acrylic) panel of about 1.0 to 3.0 mm thickness.

As shown in the drawing, the second plate-like member 200 has a larger dimension along the bonding direction than the first plate-like member 100. An adhesive layer 203 consisting of a transparent double-sided adhesive tape known as OCA is applied in advance on a surface 200a of the second plate-like member 200 to be bonded with the first plate-like member 100. The second plate-like member 200 is bonded to the first plate-like member 100 via the adhesive layer 203.

The bonding apparatus 1 includes a bonding stage 2. The bonding stage 2 has a horizontal suction surface 2a facing downwards and a plurality of suction nozzles 3 provided in the suction surface 2a. The suction nozzles 3 in the bonding stage 2 are each connected to a pump 7, which is operated under the control of a controller 6 to hold the first plate-like member 100 by suction on the suction surface 2a (see FIG. 2). At this time, a surface 100a of the first plate-like member 100 is oriented downwards. The surface 100a is to be bonded with the second plate-like member 200 oriented downwards.

The bonding apparatus 1 further includes a base 4 having a guide 5 extending along the bonding direction, a leading holder 10, a trailing holder 20, a bonding roller 30, and an intermediate support roller 40, and so on.

Figure 3:
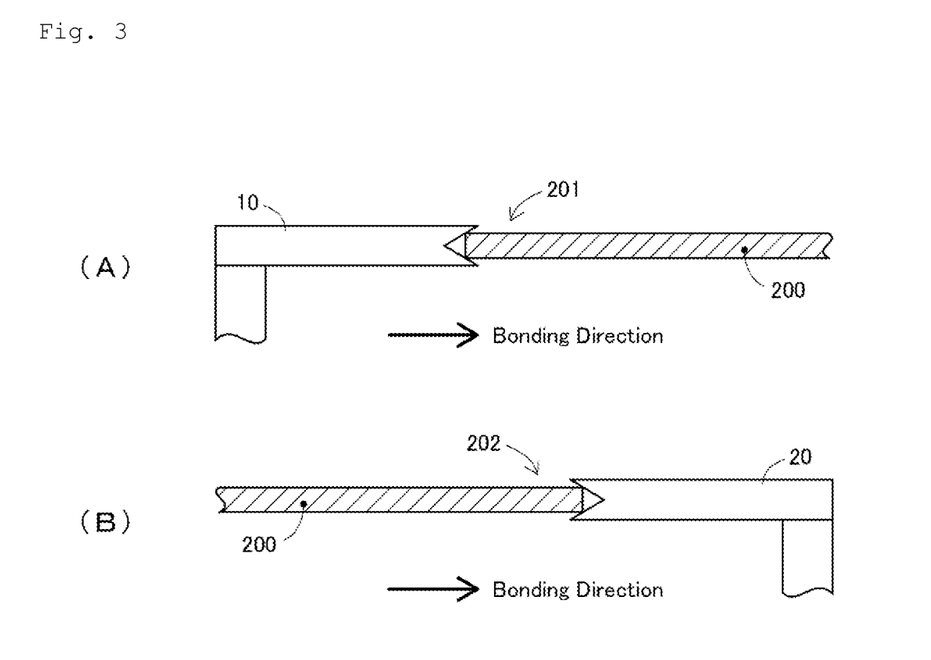
FIG. 3(A) is an enlarged view of the vicinity of a leading end support part of the bonding apparatus.
FIG. 3(B) is an enlarged view of the vicinity of a trailing end support part of the bonding apparatus.

The leading holder 10 corresponds to the "leading end support part" of the present invention. The leading holder 10 holds a leading end 201 of the second plate-like member 200 with an end face that is machined in a V-shape, as shown in FIG. 3(A), to restrict the leading end 201 from moving up and down. The leading holder 10 is fixed to a first holder support 11. The first holder support 11 is attached to a guide 13 that is arranged on one side of a second holder support 12 such as to be slidable. The second holder support 12 is fixed to the base 4.

When the first holder support 11 slides up and down relative to the second holder support 12 under the control of the controller 6, the leading holder 10, as it holds the leading end 201 of the second plate-like member 200, moves up and down (rises and lowers) therewith. It can be understood that the first holder support 11, second holder support 12, and guide 13 constitute the leading holder lifting means for raising and lowering the leading holder 10.

The trailing holder 20 corresponds to the "trailing end support part" of the present invention. The trailing holder 20 holds a trailing end 202 of the second plate-like member 200 with an end face that is machined in a V-shape, as shown in FIG. 3(B), to restrict the trailing end 202 from moving up and down. The trailing holder 20 is fixed to a first holder support 21. The first holder support 21 is attached to a guide 23 that is arranged on one side of a second holder support 22 such as to be slidable. The second holder support 22 is fixed to trailing holder moving means 24 that moves along the guide 5.

When the first holder support 21 slides up and down relative to the second holder support 22 under the control of the controller 6, the trailing holder 20, as it holds the trailing end 202 of the second plate-like member 200, moves up and down (rises and lowers) therewith. It can be understood that the first holder support 21, second holder support 22, and guide 23 constitute the trailing holder lifting means for raising and lowering the trailing holder 20.

When the trailing holder moving means 24 moves along the guide 5 under the control of the controller 6, the distance between the trailing holder 20 and the leading holder 10 increases and decreases. When the distance between the trailing holder 20 and the leading holder 10 is reduced so that the second plate-like member 200 is gripped by the trailing holder 20 and the leading holder 10, the movement of the second plate-like member 200 is restricted in the bonding direction and the opposite direction, too.

The bonding roller 30 presses the second plate-like member 200 from below on the surface 200b that is not bonded to the first plate-like member 100 (hereinafter, lower surface). The bonding roller 30 is rotatably mounted on bonding roller lifting means 31 that is configured with a cylinder and the like. The bonding roller lifting means 31 is fixed to bonding roller moving means 32 that moves along the guide 5.

When the cylinder that configures the bonding roller lifting means 31 extends and contracts under the control of the controller 6, the bonding roller 30 moves up and down (rises and lowers) therewith. When the bonding roller 30 moves up, the pressure applied on the lower surface 200b of the second plate-like member 200 increases, as a result of which the second plate-like member 200 is tightly pressed against the first plate-like member 100. On the other hand, when the bonding roller 30 moves down, pressure applied on the lower surface 200b of the second plate-like member 200 decreases.

The bonding roller lifting means 31 has a pressure sensor (not shown) that detects the pressure applied by the bonding roller 30. The controller 6 can control the up and down movement of the bonding roller 30 to achieve a predetermined pressure by referring to the pressure detected by the pressure sensor. The predetermined value may have a certain range. Namely, the controller 6 may control the up and down movement of the bonding roller 30 such that the pressure will fall between a predetermined lower limit and a predetermined upper limit. The predetermined value (or the upper and lower limits) is set such that the pressure will not be so large as to damage the second plate-like member 200 and first plate-like member 100 and that the pressure will not be too small to push out air bubbles sufficiently, and can be determined through experiments.

When the bonding roller moving means 32 moves along the guide 5 under the control of the controller 6, the bonding roller 30 moves in the bonding direction or the opposite direction. Namely, moving the bonding roller moving means 32 along the guide 5 changes the position of the bonding roller 30 relative to the first plate-like member 100 and the second plate-like member 200.

The intermediate support roller 40 corresponds to the "intermediate support part" of the present invention. The intermediate support roller 40 supports the lower surface 200b of the second plate-like member 200 at an intermediate point between the trailing end 202 and the bonding position that is pressed by the bonding roller 30. The intermediate support roller 40 is rotatably mounted on intermediate support roller lifting means 41 that is configured with a cylinder or the like. The intermediate support roller lifting means 41 is fixed to intermediate support roller moving means 42 that moves along the guide 5.

When the cylinder that configures the intermediate support roller lifting means 41 extends and contracts under the control of the controller 6, the intermediate support roller 40 moves up and down (rises and lowers) therewith, and the intermediate point of the second plate-like member 200 moves up and down. Further, when the intermediate support roller moving means 42 moves along the guide 5 under the control of the controller 6, the intermediate point being supported by the intermediate support roller 40 changes between the bonding position and the trailing end 202.

Figure 4:
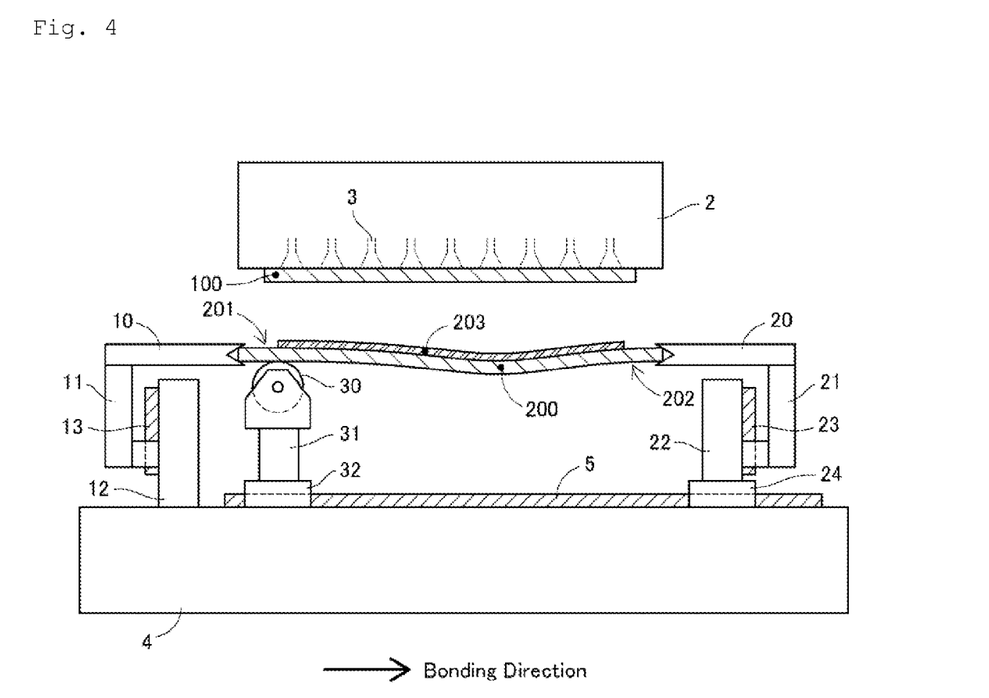
FIG. 4 is a diagram for explaining the significance of an intermediate support roller.

The second plate-like member 200 is supported at its intermediate point with the intermediate support roller 40 because of the following reasons. Without the intermediate support roller 40, the second plate-like member 200 gripped by the leading holder 10 and the trailing holder 20 may sag by its own weight as shown in FIG. 4. As a result, air bubbles may be readily entrapped during bonding, or the second plate-like member 200 may readily drop off from the leading holder 10 and the trailing holder 20.

Figure 2:
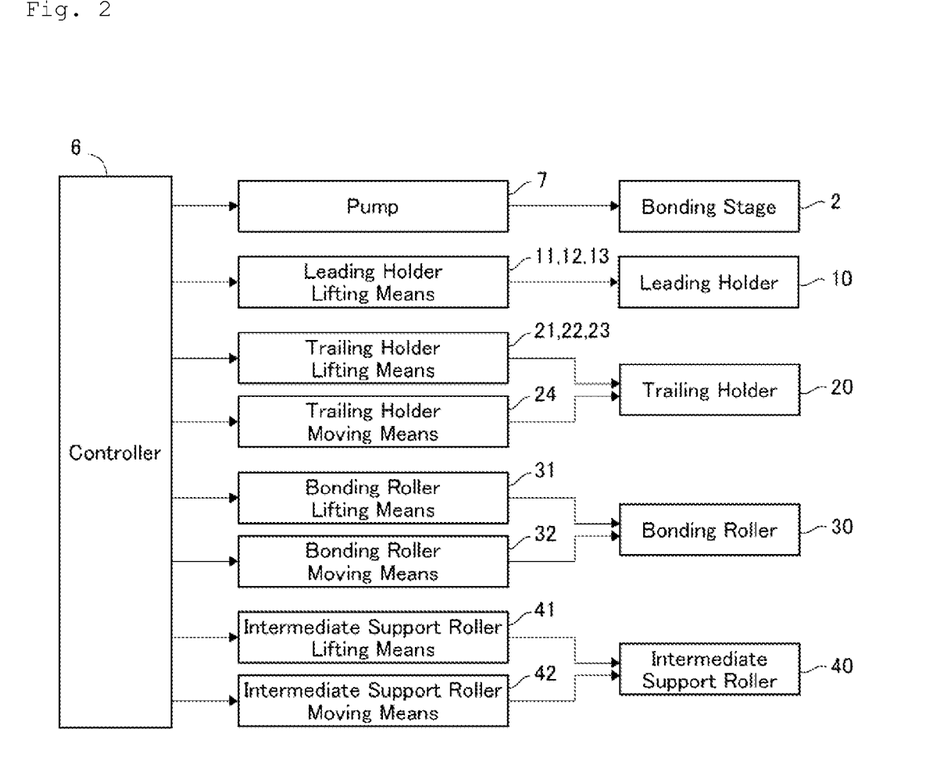
FIG. 2 is a control block diagram of the bonding apparatus.

FIG. 2 shows a control block diagram of the bonding apparatus 1 according to this embodiment. As shown in the drawing, the controller 6 controls the operations of (1) holding the first plate-like member 100 by suction on the bonding stage 2; (2) raising and lowering the leading holder 10; (3) raising, lowering, and moving the trailing holder 20; (4) raising, lowering, and moving the bonding roller 30; and (5) raising, lowering, and moving the intermediate support roller 40. The control of moving up and down the leading holder 10, trailing holder 20, and intermediate support roller 40 is the control of height, i.e., of changing the height of these parts to a target height, while the control of moving up and down the bonding roller 30 involves two types of control, i.e., the control of maintaining the pressure at a predetermined level (or within a predetermined range) and the height control.

[Bonding Operation]

Next, the bonding operation performed by the bonding apparatus 1 according to this embodiment will be described step by step.

Figure 5:
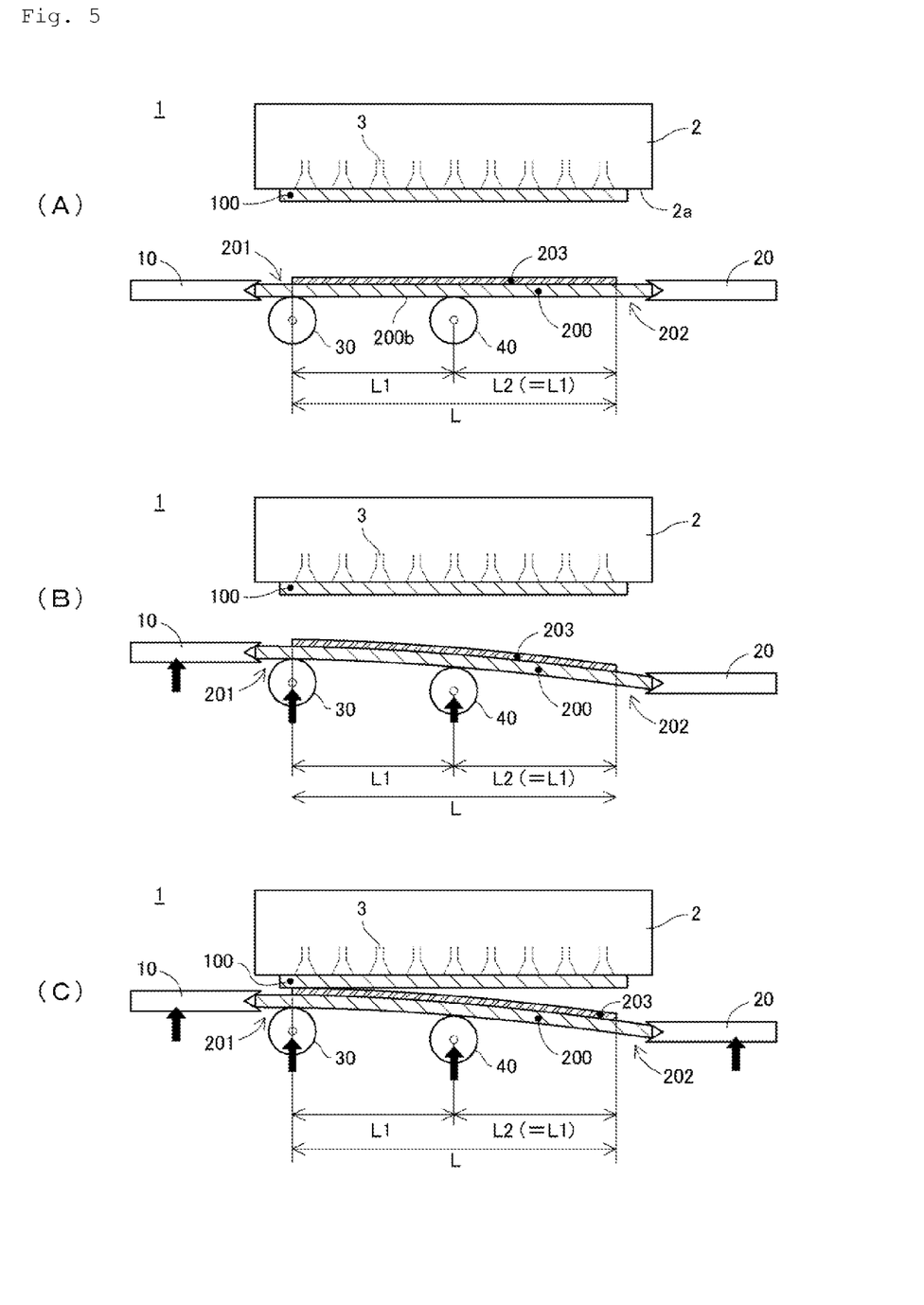
FIGS. 5(A) to 5(C) are diagrams illustrating a bonding operation by the bonding apparatus.

FIG. 5(A) illustrates the initial state before the bonding operation is started. As shown in this drawing, the first plate-like member 100 held by suction on the suction surface 2a of the bonding stage 2 is separated from the second plate-like member 200 gripped by the leading holder 10 and trailing holder 20 in the up and down direction. Since the leading holder 10 and trailing holder 20 are at the same height and the bonding roller 30 and intermediate support roller 40 are supporting the lower surface 200b of the second plate-like member 200, the second plate-like member 200 does not sag and is kept parallel to the first plate-like member 100.

In the initial state, the bonding roller 30 is positioned directly below the edge on the upstream side of the bonding direction of the adhesive layer 203. The intermediate support roller 40 is positioned at an intermediate point spaced by distance L1 from the bonding roller 30 in the bonding direction. In this embodiment, distance L1 in the initial state is set to L/2 (where L is the dimension in the bonding direction of the adhesive layer 203). Therefore, in this embodiment, distance L2 between the edge on the downstream side in the bonding direction of the adhesive layer 203 and the intermediate point is also L/2 (=L1).

Note that distance L1 is made equal to distance L2 only as one example. Distance L2 may be larger, or smaller, than distance L1. According to the present invention, distance L1 and distance L2 are determined through experiments so that the second plate-like member 200 does not sag. The positioning in the in-plane directions of the first plate-like member 100 and second plate-like member 200 has already been finished in the initial state shown in FIG. 5(A).

FIG. 5(B) shows a state when the leading holder 10 and the bonding roller 30 are moved up by substantially the same amount, and the intermediate support roller 40 is moved up by an amount smaller than that, from the initial state shown in FIG. 5(A), so that the second plate-like member 200 is brought to a predetermined bended state. In this state, the trailing holder 20 supports the trailing end 202 at a lower position than the leading end 201, while the intermediate support roller 40 supports the intermediate point of the second plate-like member 200 at a position lower than the leading end 201 but higher than the trailing end 202.

Figure 7:
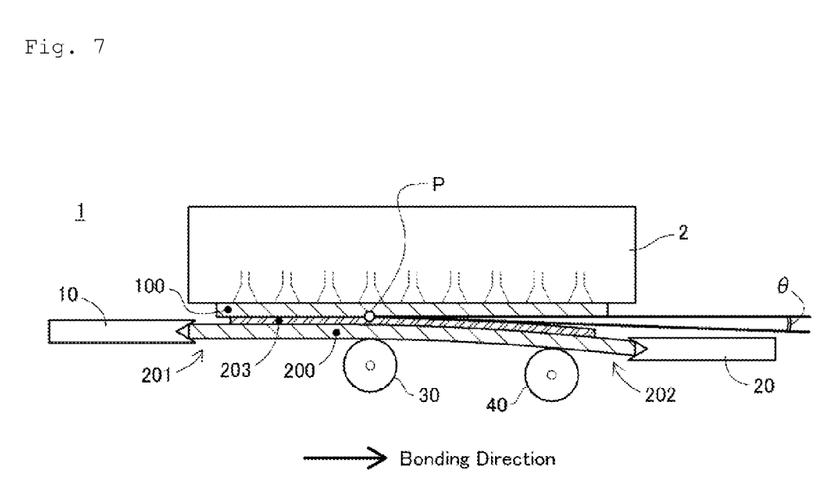
FIG. 7 is a diagram for explaining the attitude of the second plate-like member bonded by the bonding apparatus.

In order to prevent air entrapment due to premature attachment, it is preferable to bend the second plate-like member 200 largely so that the bonding angle θ at the bonding position P (see FIG. 7) will be large. However, if the bonding angle θ is too large when bonding a second plate-like member 200 that has a large thickness and high rigidity, there is a risk of damaging the second plate-like member 200. It is therefore necessary to determine the bonding angle θ based on the thickness of the second plate-like member 200. Even though the target bonding angle θ is the same, if the second plate-like member 200 has a different dimension in the bonding direction, the amount of upward movement of the leading holder 10, bonding roller 30, and intermediate support roller 40 between the state of FIG. 5(A) and that of FIG. 5(B) will be different. Therefore, in this embodiment, the predetermined bended state is determined based on the dimension in the bonding direction and the thickness of the second plate-like member 200.

FIG. 5(C) illustrates a state when the leading holder 10, bonding roller 30, intermediate support roller 40, and trailing holder 20 are moved up by the same amount from the state shown in FIG. 5(B), so that the leading end 201 of the second plate-like member 200 is bonded to the first plate-like member 100 via the adhesive layer 203. Since the leading holder 10, bonding roller 30, intermediate support roller 40, and trailing holder 20 are moved up by the same amount, the second plate-like member 200 remains in the predetermined bended state. In this embodiment, the second plate-like member 200 is kept in the predetermined bended state when the leading end 201 of the second plate-like member 200 (strictly speaking, the edge on the upstream side in the bonding direction of the adhesive layer 203) is bonded, so that the second plate-like member 200 (adhesive layer 203) makes line contact rather than surface contact with the first plate-like member 100, thereby to prevent entrapment of air bubbles at the start of bonding.

Figure 6:
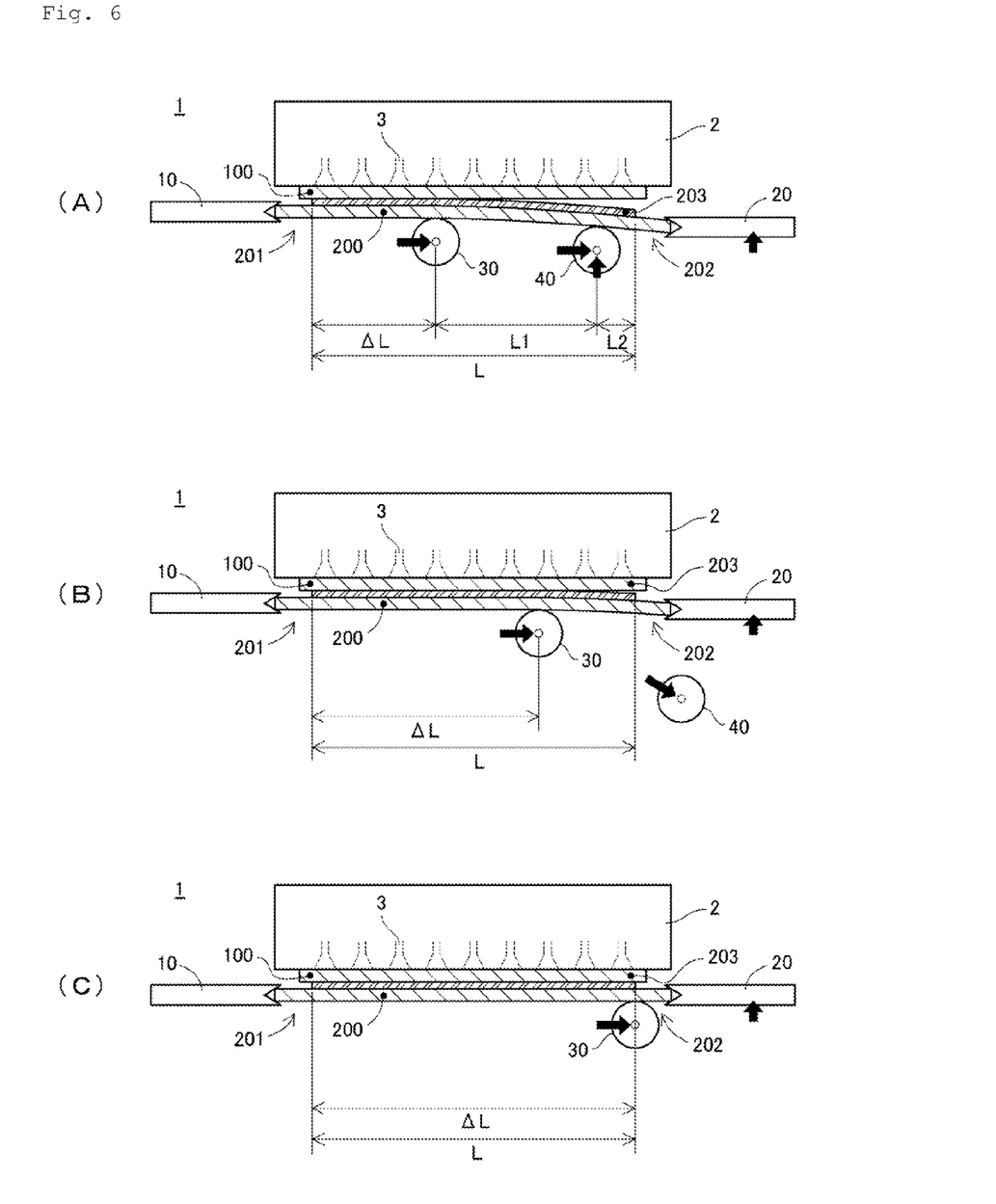
FIGS. 6(A) to 6(C) are diagrams illustrating a bonding operation by the bonding apparatus.

FIG. 6(A) illustrates a state when the bonding roller 30 and intermediate support roller 40 are moved in the bonding direction at the same speed by delta L from the state shown in FIG. 5(C), and the intermediate support roller 40 and trailing holder 20 are moved up slightly so as to keep the bonding angle θ at the bonding position P constant. The moving bonding roller 30 is controlled to apply a predetermined value (or range) of pressure to the second plate-like member 200 by the pressure control. Therefore, the height of the bonding roller 30 may vary to some extent while moving. On the other hand, the height of the leading holder 10 does not change at all.

In this embodiment, the target bonding angle θ is set to 5° in consideration of the thickness of the second plate-like member 200. The target bonding angle θ may have a certain range. In that case, the control of moving up and down (changing the height of) the intermediate support roller 40 may possibly be omitted.

FIG. 6(B) illustrates a state when the bonding roller 30 and intermediate support roller 40 are further moved from the state shown in FIG. 6(A), and the intermediate support roller 40 that has reached near the trailing end 202 is retracted so as not to impede the movement of the bonding roller 30 thereafter. Since the distance (L−□L) between the bonding roller 30 and the trailing end 202 is reduced from that of the initial state, the unbonded portion of the second plate-like member 200 does not sag even when the intermediate support roller 40 retracts. The bonding roller 30 is controlled to apply a predetermined value (or range) of pressure to the second plate-like member 200 by the pressure control during the processes of FIG. 6(A) and FIG. 6(B). Also, the trailing holder 20 is moved up slightly to keep the bonding angle θ constant (or within a predetermined range) during the processes of FIG. 6(A) and FIG. 6(B). At this state, the trailing holder 20 is still supporting the trailing end 202 at a lower position than the leading end 201.

In this embodiment, when distance L2 becomes lower than a predetermined threshold, the controller 6 controls the intermediate support roller lifting means 41 and the intermediate support roller moving means 42 to retract the intermediate support roller 40. The method of determining whether the intermediate support roller 40 has reached near the trailing end 202, and the method of retracting the intermediate support roller 40 may be changed appropriately as required.

FIG. 6(C) illustrates a state when the bonding roller 30 moves further from the state shown in FIG. 6(B) and reaches the edge on the downstream side in the bonding direction of the adhesive layer 203, in other words, the state when the second plate-like member 200 has been completely bonded to the first plate-like member 100. The bonding roller 30 is controlled to apply a predetermined value (or range) of pressure to the second plate-like member 200 by the pressure control during the processes of FIG. 6(B) and FIG. 6(C). Also, the trailing holder 20 is moved up slightly to keep the bonding angle θ constant (or within a predetermined range) during the processes of FIG. 6(B) and FIG. 6(C). As shown in FIG. 6(C), when the bonding is complete, the leading holder 10 is positioned at the same height as the trailing holder 20.

As described above, with the bonding apparatus 1 according to this embodiment, the second plate-like member 200 is kept in a predetermined bended state during bonding by means of the leading holder 10, intermediate support roller 40, and trailing holder 20, so that entrapment of air bubbles due to premature attachment is reliably prevented.

With the bonding apparatus 1 according to this embodiment, as the intermediate support roller 40 supports the lower surface 200b of the second plate-like member 200 at an intermediate point between the bonding position P and the trailing end 202, the second plate-like member 200 is prevented from sagging by its own weight during bonding.

With the bonding apparatus 1 according to this embodiment, bonding is performed while the bonding roller 30 that is controlled to apply a predetermined value (or range) of pressure pushes out air bubbles, so that air entrapment between the first plate-like member 100 and the second plate-like member 200 is prevented even though the bonding is performed in the atmosphere.

The bonding apparatus according to the present invention is not limited to the bonding apparatus 1 of the embodiment described above.

Variation Example 1

Figure 8:
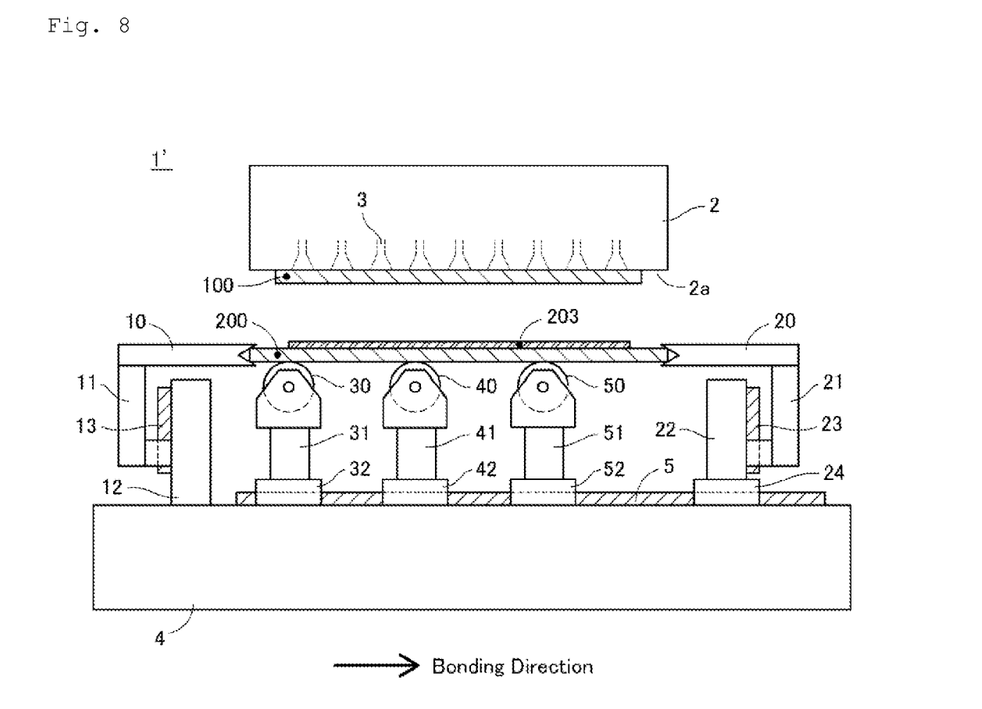
FIG. 8 is a side view of a bonding apparatus according to a variation example of the present invention.

For example, in the bonding apparatus 1' according to Variation Example 1 shown in FIG. 8, the "intermediate support part" has two intermediate support rollers 40 and 50. The intermediate support roller 50 supports the lower surface 200b of the second plate-like member 200 at a position between the intermediate point that is supported by the intermediate support roller 40 and the trailing end 202. The intermediate support roller 50 is rotatably mounted on intermediate support roller lifting means 51 that is configured with a cylinder and the like. The intermediate support roller lifting means 51 is fixed to intermediate support roller moving means 52 that moves along the guide 5.

When the cylinder that configures the intermediate support roller lifting means 51 extends and contracts under the control of the controller 6, the intermediate support roller 50 moves up and down (rises and lowers) therewith. When the intermediate support roller moving means 52 moves along the guide 5 under the control of the controller 6, the position being supported by the intermediate support roller 50 changes between the intermediate point and the trailing end 202.

In this variation example, bonding is performed as the bonding roller 30, intermediate support roller 40 and intermediate support roller 50 move at the same speed in the bonding direction. When the intermediate support roller 50 reaches near the trailing end 202, it is retracted so as not to impede the movement of the bonding roller 30 and intermediate support roller 40 thereafter.

In this variation example, the second plate-like member 200 is bonded as the trailing holder 20 supports the trailing end 202 at a lower position than the leading end 201, the intermediate support roller 40 supports the intermediate point of the second plate-like member 200 at a position lower than the leading end 201 but higher than the trailing end 202, and the intermediate support roller 50 supports the second plate-like member 200 at a position lower than the intermediate point but higher than the trailing end 202.

With the bonding apparatus 1' according to this variation example, a large second plate-like member 200 that cannot fully be prevented from sagging with the bonding apparatus 1 according to the embodiment can be bonded to the first plate-like member 100 without deflection. The number of intermediate support rollers may be three or more depending on the size of the second plate-like member 200.

Variation Example 2

In the embodiment and Variation Example 1 described above, two or three rollers are moved at the same speed in the bonding direction to change the relative positions of the rollers and the first and second plate-like members 100 and 200. Instead of moving the rollers, the bonding stage 2, leading holder 10, and trailing holder 20 may be moved in the opposite direction from the bonding direction to change the relative positions. The two or three rollers may not necessarily be moved at the same speed.

Variation Example 3

In the embodiment and variation examples described above, the intermediate support member is one or two or more intermediate support rollers, but the intermediate support member is not limited to rollers. In the present invention, any component that satisfies the following three conditions can be used as the intermediate support member:

(1) It has enough rigidity to be able to support the second plate-like member 200;
(2) It can smoothly move along the bended second plate-like member 200; and
(3) It does not damage the second plate-like member 200.

Variation Example 4

In the embodiment and variation examples described above, bonding is achieved through a transparent double-sided adhesive tape as the adhesive layer 203. Instead, bonding may be achieved via a highly viscous thermosetting resin or light curing resin. The transparent double-sided adhesive tape as the adhesive layer 203 may be provided on the first plate-like member 100. If thermosetting resin or light curing resin is used for the adhesive layer 203, the adhesive layer 203 need not be provided in a laminar form in the initial state shown in FIG. 5(A), but the thermosetting resin or light curing resin may be applied in dots or lines and spread during bonding.

Variation Example 5

The end shape of the leading holder 10 and the trailing holder 20 that support the leading end 201 and the trailing end 202 of the second plate-like member 200 is not limited to the V-shape. The end of the leading holder 10 can have any shape as long as it can restrict the movement of the leading end 201 in the up and down direction. The same applies to the end shape of the trailing holder 20.

DESCRIPTION OF REFERENCE SIGNS

1: Bonding apparatus
2: Bonding stage
3: Suction nozzle
4: Base
5: Guide
6: Controller
7: Pump
10: Leading holder (leading end support part)
11: First support of leading holder (leading holder lifting means)
12: Second support of leading holder (leading holder lifting means)
13: Guide (leading holder lifting means)
20: Trailing holder (trailing end support part)
21: First support of trailing holder (trailing holder lifting means)
22: Second support of trailing holder (trailing holder lifting means)
23: Guide (trailing holder lifting means)
24: Trailing holder moving means
30: Bonding roller
31: Bonding roller lifting means 32: Bonding roller moving means
40: Intermediate support roller (intermediate support part)
41: Intermediate support roller lifting means
42: Intermediate support roller moving means
50: Intermediate support roller (intermediate support part)
51: Intermediate support roller lifting means
52: Intermediate support roller moving means
100: First plate-like member
200: Second plate-like member
201: Leading end
202: Trailing end
203: Adhesive layer

The invention claimed is:

1. A bonding apparatus, wherein a first plate-like member supported on a lower surface of a bonding stage and a second plate-like member located lower than the first plate-like member are positioned, after which the second plate-like member is pressed from below with a bonding roller, and the bonding roller is moved relative to the first plate-like member and the second plate-like member in a bonding direction, so as to bond the second plate-like member to the first plate-like member, the bonding apparatus comprising:
   a leading end support part that is movable up and down and restricts a leading end of the second plate-like member on an upstream side in the bonding direction from moving in an up and down direction;
   a trailing end support part that is movable up and down and restricts a trailing end of the second plate-like member on a downstream side in the bonding direction from moving in an up and down direction; and
   an intermediate support part that is movable up and down, and moves in the same direction as the bonding roller while supporting the second plate-like member at an intermediate point between the trailing end and a bonding position that is pressed by the bonding roller, wherein
   when the bonding roller is moving, the trailing end support part keeps supporting the trailing end at a lower position than the leading end, and the intermediate support part keeps supporting the intermediate point of second plate-like member at a position lower than the leading end but higher than the trailing end.

2. The bonding apparatus according to claim. 1, wherein the trailing end support part and the intermediate support part are controlled to move up and down in synchronism with the movement of the bonding roller and the intermediate support part so as to maintain the second plate-like member in a predetermined bended state.

3. The bonding apparatus according to claim 2, wherein the predetermined bended state is determined based on a thickness and a dimension in the bonding direction of the second plate-like member.

4. The bonding apparatus according to claim 1, wherein pressure applied by the bonding roller is kept constant during the movement of the bonding roller.

5. The bonding apparatus according to claim 1, wherein the intermediate support part comprises an intermediate support roller.

6. The bonding apparatus according to claim 5, wherein during the movement of the bonding roller and the intermediate support roller, when the intermediate support roller reaches near the trailing end, the intermediate support roller is retracted so as not to impede the movement of the bonding roller thereafter.

7. The bonding apparatus according to claim 1, wherein the intermediate support part comprises a plurality of intermediate support rollers arranged at a predetermined distance in the bonding direction.

8. The bonding apparatus according to claim 7, wherein during the movement of the bonding roller and the plurality of intermediate support rollers, when one of the plurality of intermediate support rollers reaches near the trailing end, this intermediate support roller is retracted so as not to impede the movement of the bonding roller and other intermediate support rollers thereafter.

9. The bonding apparatus according to claim 1, wherein the trailing end support part supports the trailing end at a lower position than the leading end, and the intermediate support part supports the intermediate point of second plate-like member at a position lower than the leading end but higher than the trailing end so as to bring the second plate-like member to a predetermined bended state, after which the leading end support part, the trailing end support part, the bonding roller, and the intermediate support part move up by the same amount, so as to bond the leading end of the second plate-like member to the first plate-like member.

10. The bonding apparatus according to claim 1, wherein a glass cover as the second plate-like member is bonded to a liquid crystal panel or a touch panel as the first plate-like member.

* * * * *